(12) United States Patent
Wageman

(10) Patent No.: US 8,060,063 B1
(45) Date of Patent: Nov. 15, 2011

(54) PRESENTING MESSAGES ON A MOBILE DEVICE THAT IS CURRENTLY PRESENTING OTHER MEDIA CONTENT

(75) Inventor: Anthony J. Wageman, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1072 days.

(21) Appl. No.: 11/851,668

(22) Filed: Sep. 7, 2007

(51) Int. Cl.
*H04M 1/725* (2006.01)
*H04M 1/663* (2006.01)
*H04L 12/58* (2006.01)
*H04M 11/10* (2006.01)
*H04M 3/42* (2006.01)
*H04M 3/00* (2006.01)
*H04M 5/00* (2006.01)
*H04W 4/00* (2009.01)

(52) U.S. Cl. .................. 455/412.2; 455/412.1; 455/413; 455/416; 455/466; 379/265.09

(58) Field of Classification Search ............... 455/414.1, 455/412.1–413, 416, 466; 379/265.09
See application file for complete search history.

(56) References Cited

U.S. PATENT DOCUMENTS

| 2003/0225832 | A1* | 12/2003 | Ludwig .................. 709/204 |
| 2005/0064883 | A1* | 3/2005 | Heck et al. ................ 455/466 |
| 2007/0022201 | A1* | 1/2007 | Aaby et al. ................ 709/227 |
| 2007/0145135 | A1* | 6/2007 | Jogand-Coulomb et al. . 235/451 |
| 2009/0111433 | A1* | 4/2009 | Muhonen et al. ........ 455/414.1 |

OTHER PUBLICATIONS

YouTube Feb. 2005, Wikipedia, 1 page.*
YouTube, www.youtube.com, 1 page.*

* cited by examiner

*Primary Examiner* — Nick Corsaro
*Assistant Examiner* — Munsoon Choo

(57) ABSTRACT

Computer readable media are provided for displaying a message notification on a mobile device while the mobile device is presenting media content to a user. An embodiment of the media determines if the mobile device is presenting media content. If the mobile device is presenting media content, an activation message is sent to the mobile device that instructs it to present a message notification in a manner that does not interrupt the media presentation.

20 Claims, 4 Drawing Sheets

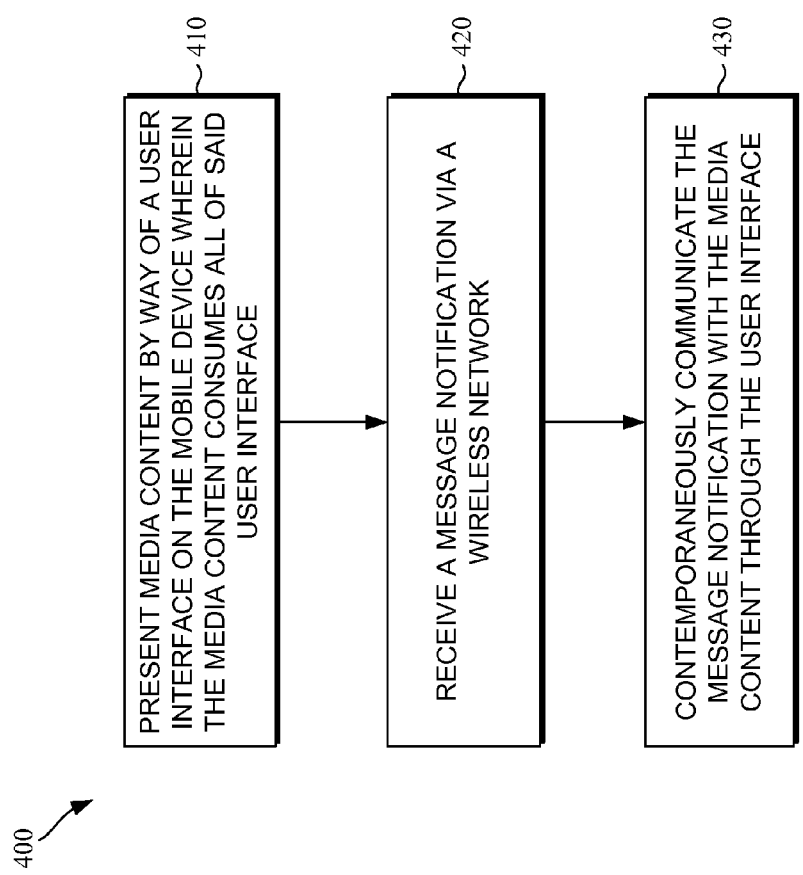

PRESENTING MESSAGES ON A MOBILE DEVICE THAT IS CURRENTLY PRESENTING OTHER MEDIA CONTENT

SUMMARY

The present invention is defined by the claims below. Embodiments of the present invention notify a mobile-device user that a message is waiting without disrupting the presentation of media content on the mobile device. The present invention has several practical applications in the technical arts including allowing a mobile-device user to view media content and receive a message notification simultaneously.

In a first aspect, a set of computer-executable instructions provide for performing a method of sending a message notification to a mobile device having a display. The method includes determining whether the mobile device is currently receiving media content when attempting to communicate the message notification to the mobile device. If the mobile device is receiving media content, an activation message is transmitted to the mobile device that instructs the mobile device to begin a notification-presentation process that comprises, allocating a first portion of the display in which to continue presenting media content, and allocating a second portion of the display in which to present the message notification. Finally, the media content is presented in the first portion contemporaneously with the message notification in the second portion.

In another aspect, a set of computer-executable instructions provide for performing a method of communicating a message notification on a mobile device. The method includes, when attempting to communicate the message notification to the mobile device, determining whether the mobile device is currently receiving media content by a process that comprises receiving a message from a network component indicating that the mobile device is receiving media content. If the mobile device is receiving media content then an activation message is communicated to the mobile device that instructs the mobile device to begin a notification-presentation process that results in presenting the message notification contemporaneously with the media content.

In a final aspect, a set of computer-executable instructions provide for performing a method of communicating a message notification on a mobile device. The method includes presenting media content through a user interface on the mobile device. The media content consumes all of the user interface during the presentation of media content. When a message notification is received via a wireless network it is communicated contemporaneously with the media content.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 is a flow diagram in which a second method of communicating a message notification on a mobile device is shown according to an embodiment of the present invention.

DETAILED DESCRIPTION

Figure 1:
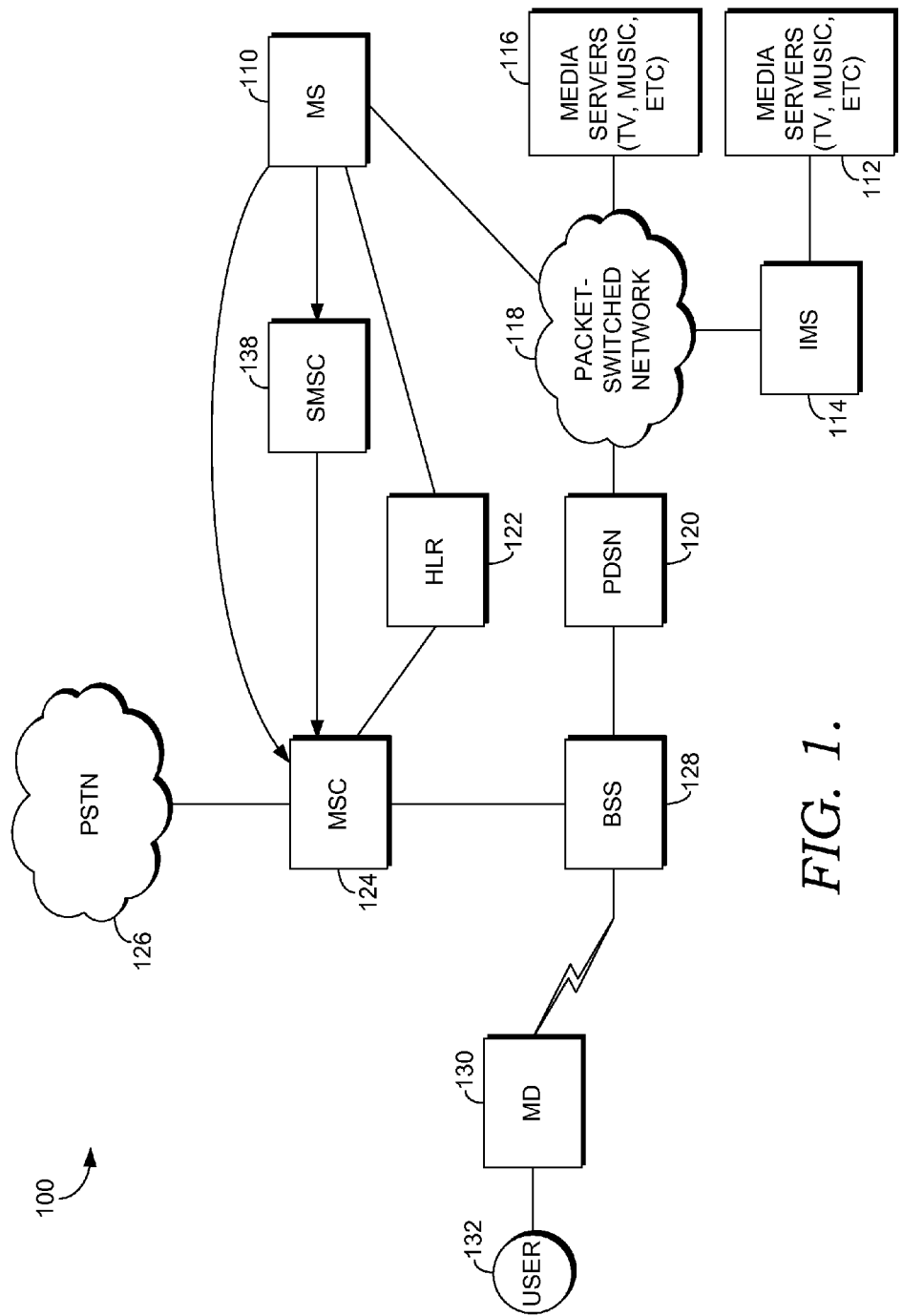
FIG. 1 depicts an illustrative environment in which the present invention may operate.

Embodiments of the present invention provide systems and methods for notifying a mobile-device user that a message is waiting without disrupting the presentation of media content on the mobile device. Users can stay informed about messages received during a media presentation without discontinuing the media presentation. Additionally, the message notifications are presented in a manner that minimizes the disruption to the user's enjoyment of the presentation.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AS | Application Server |
| CDMA | Code Division Multiple Access |
| CD-ROM | Compact Disk Read Only Memory |
| DVD | Digital Versatile Discs |
| EEPROM | Electrically Erasable Programmable Read Only Memory |
| GSM | Global System for Mobile Communications |
| HLR | Home Location Register |
| IMS | IP Multimedia Subsystem |
| LAN | Local Access Network |
| MSC | Mobile Switching Center |
| PDA | Personal Digital Assistant |
| PDSN | Packet Data Serving Node/Home Agent |
| RAM | Random Access Memory |
| ROM | Read Only Memory |
| SMSC | Short Messaging Service Center |
| SIP | Session Initiation Protocol |
| TDMA | Time Division Multiple Access |

Further, various technical terms are used throughout this description. An illustrative resource that fleshes out various aspects of these terms can be found in *Newton's Telecom Dictionary* by H. Newton, $22^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-executable instructions embodied on one or more computer-readable media.

Computer-readable media include both volatile and non-volatile media, removable and non-removable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Embodiments of the present invention may be practiced in a communications network providing service to mobile device. An illustrative operating environment 100 that contains a few of the components within such a communication network is shown in FIG. 1. The components shown in FIG. 1 are the primary components the invention may interact with during operation. The components shown in FIG. 1 are described in brief, and with an emphasis on function for the sake of simplicity. The components within FIG. 1 are communicatively coupled to each other in a manner appropriate for carrying out their respective function within the operating environment 100. Embodiments of the present invention are not limited by the communication protocols or formats used to facilitate communication between components, those mentioned are for the sake of enablement and not meant to be limiting.

The illustrative operating environment includes a messaging server 110. Messaging server 110 can be a combination of hardware and software. The hardware aspect includes a computing device that includes a CPU, short term memory, long term memory, and one or more network interfaces. A network interface is used to connect to a LAN, WAN (including the Internet), or other variety of communication network. The network interface to the WAN or LAN could be wired, wireless, or both. In one embodiment, software on messaging server 110 allows it to communicate with other computers and network components coupled to a common network through the network interface. In one embodiment, the software on messaging server 110 facilitates sending message notifications to mobile device 130. A message notification communicates to the user of mobile device 132 that a message has been received and is waiting for attention. An example of a message notification is a voicemail waiting notification. Messaging server 110 may send a digital message notification in RTP format through packet-switched network 118. Messaging server 110 may also send out a message notification through the signaling network utilizing home location register (HLR) 122 and mobile switch center (MSC) 124. Further, messaging server 110 may also send out a SMS message through the paging system, including short messaging service center (SMSC) 138. Messaging server 110 includes a variety of computer-readable media and the ability to access and execute instructions contained on the media. The above description of hardware and software is illustrative only; many other features of a message server 110 were not listed so as to not obscure embodiments of the present invention.

Short messaging service center (SMSC) 138 helps direct text messages (SMS messages) between users. When a user sends a text message to another user, the message gets stored in SMSC 138, which delivers it to the destination user when they are available. A message may also come from an application, for example an application on messaging server 110 could send out message notifications. SMSC 138 may communicate with HLR 122 to determine the location of a message recipient.

Home location register (HLR) 122 helps route calls and text messages and ensure security. HLR 122 has a built in authentication center, which is a database of subscriber information, including access rights and services subscribed to. Other components within operating environment 100 communicate with HLR 122 to determine the location of mobile device 130.

Mobile switching center MSC 124 provides services and coordination between mobile device 130 in a network and external networks such public switched telephone network (PSTN) 126.

Base station 128 is a fixed station used for communicating with mobile device 130. Standard air interface protocols, such as code division multiple access ("CDMA"), global system for mobile communications ("GSM"), or time division multiple access ("TDMA"), as well as others, may be used by base station 128 to communicate with mobile device 130. Other network communication interface arrangements are also possible. A base station controller (not shown) is responsible for handling traffic and signaling with mobile device 130. Only one base station 128 is shown, and without its many components, for the sake of clarity. Mobile device 130 could be in simultaneous communication with multiple base stations.

Mobile device 130 is a wireless terminal that is adapted to receive communications and media over the wireless networks included in operating environment 100. Some lower-level details of mobile device 130 are not shown so as to not obscure embodiments of the present invention. For example, mobile device 130 may include a bus that directly or indirectly couples the following devices: memory: one or more processors, one or more presentation components such as a display or speaker, input/output (I/O) ports, I/O components, and a power supply such as a battery. Mobile device 130 may communicate via wireless protocols, such as code division multiple access ("CDMA"), global system for mobile communications ("GSM"), or time division multiple access ("TDMA"), as well as others, to communicate with base station 128.

Mobile device 130 may take on any of a variety of forms. By way of example, mobile device 130 may be a mobile telephone, pager, computing device, personal digital assistant ("PDA") or any combination of these or other devices. Mobile device 130 has the ability to present one or more forms of media content. Examples of media content that could be displayed include, TV shows, movies, videos, MP3 files, and radio programs. This list is not exhaustive. The media may be presented as it is received from the wireless network or from memory within mobile device 130. Mobile device 130 may also be capable of receiving one or more forms of communication. Examples of communications that may be received include, phone calls, video calls, text messages, multimedia messages, emails, calendar updates, and task reminders.

User 132 is a person who is associated with mobile device 130. For example, a phone call placed to mobile device 130 would be intended for user 132. User 132 is the ultimate recipient of communications (e.g. emails, phone calls, text messages) and media content sent to mobile device 130.

IP Multimedia Subsystem network IMS 114 is a standardized architecture for telecom operators who want to provide mobile, fixed multimedia, and other services. It supports a Voice-over-Packet (VoP) implementation based on a 3GPP standardized implementation of the session initiation protocol (SIP) that can run over the standard Internet Protocol (IP). Existing phone systems (both packet-switched and circuit-switched) can be supported by the IMS including authorization, call routing, and accounting features. IMS uses open standard IP protocols, defined by the IETF (Internet Engineering Task Force). In one embodiment, the IMS is used to establish a media connection between affiliated media server 112 and mobile device 130.

Affiliated media server 112 and non-affiliated media server 116 may be combinations of hardware and software. The hardware aspect is a computing device that may include a CPU, short term memory, long term memory, and one or more network interfaces. The network interface is used to connect to a LAN, WAN (including the Internet), or other variety of communication network. The network interface to the WAN or LAN could be wired, wireless, or both. In one embodiment, software on affiliated media server 112 and non-affiliated media server 116 allows them to transmit media content (e.g. movies, videos, MP3's, etc.) to mobile device 130. The affiliated media server 112 and non-affiliated media server 116 transmit the media content over the packet switched network 118. Affiliated media server 112 is affiliated with the entity providing the mobile communication server to mobile device 130. A media server is affiliated with an entity if it is owned or operated by the entity, or by a third party that has an agreement with the entity. Non-affiliated media server 116 is not affiliated with the entity providing the mobile communication service to mobile device 130. The non-affiliated media server 116 may communicatively couple to mobile device 130 via the Internet.

Packet Switched Network 118, is a network designed to carry data in the form of packets. Packet switched network 118, is a wide are network (WAN) and may include the Internet.

Packet Data Server Node (PDSN) 120 acts as the connection point between base station 128 and packet switched network 118. PDSN 120 provides a routing function for IP packets, and manages the session between packet switched network 118 and mobile base station 128.

Figure 2:
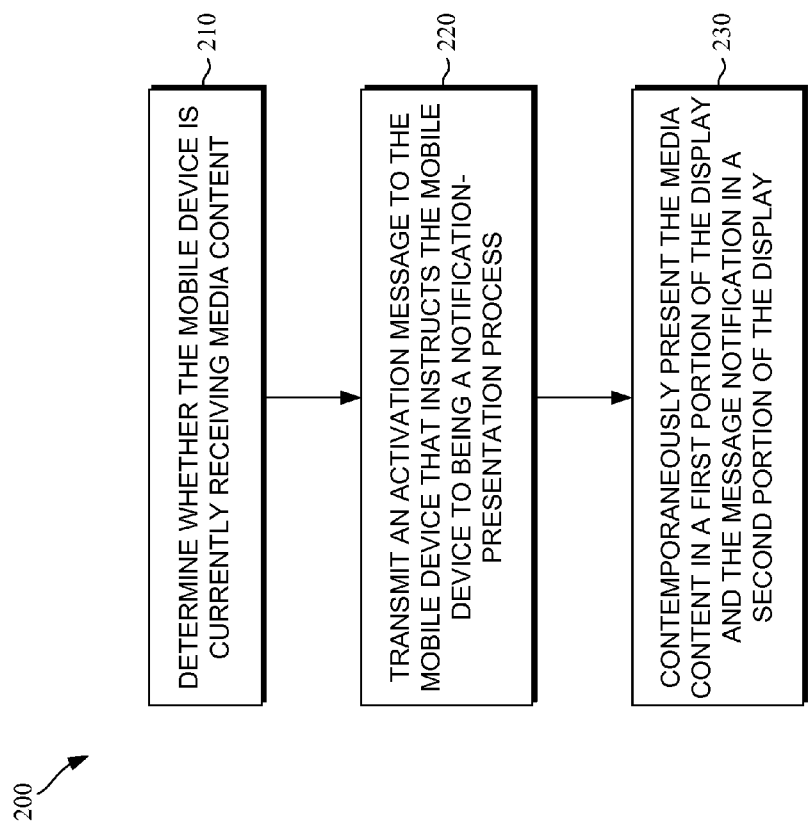
FIG. 2 is a flow diagram in which a method of sending a message notification to a mobile device having a display is shown according to an embodiment of the present invention.

Having described an illustrative operating environment, more precise aspects of the invention will now be described. With reference to FIG. 2, a method of sending a message notification to a mobile device (such as mobile device 130 in FIG. 1) having a display is shown. The display is suitable for viewing media content such as movies, videos, video calls, or television shows. A LCD screen is one example of a display that might be used on the mobile device. At step 210, messaging server 110 determines whether mobile device 130 is currently receiving media content. Messaging server 110 makes this determination every time it attempts to communicate a message notification to mobile device 130. The determination may occur in one of two manners. First, messaging server 110 could query other network components that have knowledge of whether the mobile device is receiving media content. Secondly, messaging server 110 may view a user profile that is continuously updated to reflect whether mobile device 130 is receiving media content.

In the first instance, messaging server 110 may query any component within the network that knows, or is capable of determining, whether mobile device 130 is receiving media content. Examples of components that could be queried include PDSN 120, IMS 114, affiliated media server 112, or mobile device 130. The query may be in the form of a SIP notify, or other format. Messaging server 110 may query PDSN 120 to determine if mobile device 130 is receiving media content. PDSN 120 can determine whether mobile device 130 is receiving media content by evaluating the type of packet the mobile device is receiving. Or, if the mobile device is receiving no packets then PDSN 120 will know that the mobile device is not receiving media content. The type of packet is determined by reading the packet header, and comparing it with headers known to be placed on media packets. PDSN 120 could respond to the query by communicating a packet type that is being sent to mobile device 130. Or, PDSN 120 could return a yes/no response if PDSN 120 is programmed to differentiate media from non-media packets.

Messaging server 110 could also query IMS 114. IMS 114 knows whether the mobile device is receiving media content when the media session is set up through IMS 114. IMS 114 may not be aware of whether mobile device 130 is receiving media if the media is downloaded from non-affiliated media server 116. If IMS 114 is queried regarding the media reception status of mobile device 130, it could respond to the query in a yes/no fashion, or it could communicate the type of packet that is being sent to mobile device 130, if any.

The messaging server 110 could also query the affiliated media server 112 regarding the media reception status of mobile device 130. Media server 112 could reply to the query with a yes/no answer, or communicate the type of packet that was being sent. Querying non-affiliated media server 116 may be possible if non-affiliated media server 116 is known to messaging server 110.

Finally, messaging server 110 could query mobile device 130. Mobile device 130 is in the best position to know if it is currently presenting media. In particular, the other network components are unlikely to know if mobile device 130 is presenting media stored on mobile device 130. For example, PDSN 120 is unlikely to know if mobile device 130 is playing a MP3 or video stored in mobile device's 130 memory. Mobile device 130 could respond to the query in a yes/no fashion, by communicating the type of packets it is receiving, or by communicating the type of media content that is being presented. Communications between messaging server 110 and other components could occur using a SIP notify or other communication method.

At step 220, an activation message is transmitted to mobile device 130 that instructs the mobile device to begin a notification-presentation process that is compatible with the media presentation. There are a variety of methods and formats in which the activation message could be sent to mobile device 130 by messaging server 110. For example, the activation message may be sent as an RTP packet. Using the RTP format is well suited for when the changes to the media presentation are managed by a media client or a notification client. The media client is one or more applications on the mobile device 130 that present media through an interface on mobile device 130. The notification client is an application on mobile device 130 that presents message notifications. The RTP packet is recognized by the media client, or the message notification client. In response to the information in the packet, the client presents the message notification without discontinuing the media presentation and with minimal disruption to the media presentation. The actual message notification may also be sent in the RTP format and be separate from or together with the activation message.

Secondly, the activation message may be sent to the phone as a SIP Invite or SIP Notify message. The SIP Invite message and SIP Notify message are well suited for communicating with the operating system on mobile device 130. The operating system may be used to adjust the media presentation so that the media presentation is not discontinued and the disruption to the presentation is minimized. The SIP Invite message and SIP Notify message could contain the actual message notification or the message notification could be sent separately.

Additional methods of transmitting the activation message include an SMTP message or an SMS message. The SMS message may be in the teleservice ID 4099 format so that the receipt of the message is transparent to user 132. The SMS message could be received by the operating system or the media or notification client on mobile device 130.

The content of the activation message sent at step 220 provides instructions for a notification presentation that does not discontinue the media presentation. The instructions within the activation message direct mobile device 130 to allocate a first portion of the display and second portion of the display. At step 230, the media content is presented in the first portion of the display contemporaneously with the message notification in the second portion of the display. Portions of the display may be allocated by the operating system or by a notification or media client running on mobile device 130. The message notification may indicate that a variety of message types are waiting. For example, the message notification may communicate that a voicemail has been received and is waiting to be retrieved. Or, the message notification may communicate that an email, multimedia message, or text message is waiting to be read. Additionally, the message notification could communicate that a calendar notification or a task notification is waiting to be read. Other message notifications could also be received; the previous list of examples is not intended to be exhaustive.

The second portion of the display, which is reserved to communicate the message notification, may be a bar along the top, bottom or either side of the display. The message notification could be presented in the bar using text or an icon. The icon could generally indicate that a message notification has been received, or it could specifically indicate the type of message notification that has been received.

Instead of a bar, the second portion of the display could also be shaped and sized to display an icon that communicates the message notification. The icon could be specific to the type of message notification received. For example, one icon could communicate that a voice mail has been received while a second icon could be used to communicate that a text message has been received. If an icon is used to communicate the message notification, it is preferably located near the perimeter of the display so that disruption to the presentation is minimized. Once the message notification has been displayed in the second portion of the display it may persist. In the alternative, the second portion of the display may disappear and the media presentation may be resized and continue in the entire display.

A third option is to have the display segregated into a first portion and a second portion throughout the media presentation so the screen does not have to be resized when an activation message or message notification is received. In this embodiment, text or icons could be use to communicate that a message notification has been received. The message notification could persist in the second portion of the display or the message notification could disappear after a preset time. In all of these examples, the message notification could be interactive such that the message notification or the message is displayed upon selecting the message notification.

Method 200 may be employed when mobile device 130 is receiving or is viewing a variety of media content. Examples of media content that could be viewed include a TV program, a movie, a video call, a video, or a slideshow. In addition, the media content that is the subject of the presentation may reside on memory within mobile device 130. Or, the media content could be received over the wireless network from affiliated media-server 112, or non-affiliated media server 116.

Figure 3:
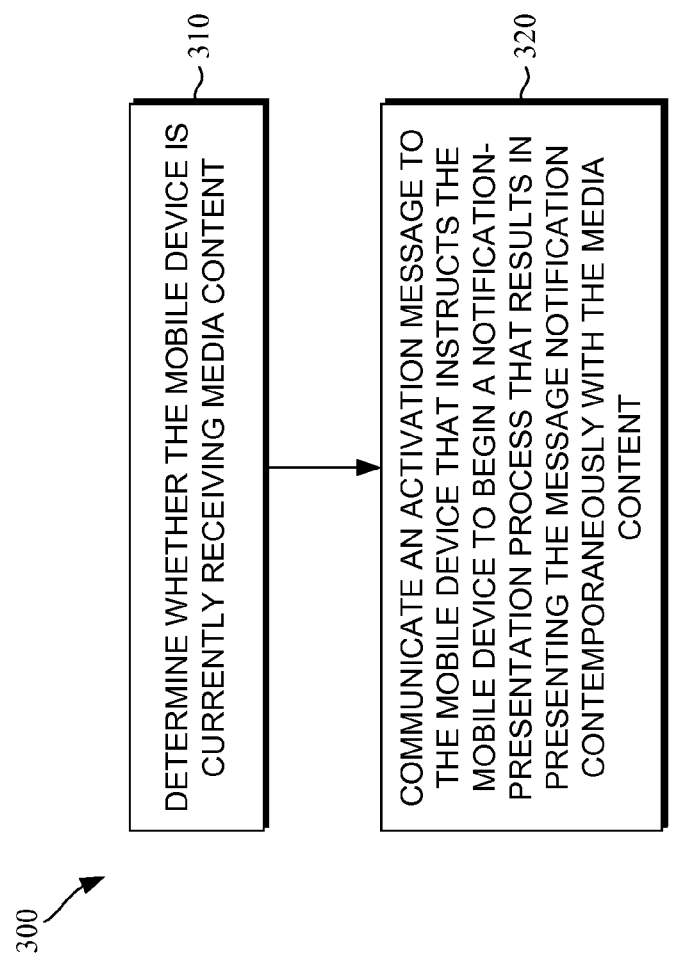
FIG. 3 is a flow diagram in which a method of communicating a message notification on a mobile device is shown according to an embodiment of the present invention.

With regard to FIG. 3, a method of communicating a message notification on a mobile device (such as mobile device 130 in FIG. 1) is disclosed. At step 310, message server 110 determines whether mobile device 130 is currently receiving media content. Message server 110 determines whether mobile device 130 is currently receiving media content using a process that includes receiving a message from a network component that indicates mobile device 130 is receiving media content. The message may be sent to message server 110 in response to a query sent out by message server 110. The response to the query could specify the type of packet that is being sent to the mobile device, or it could be a yes/no answer indicating whether media is being presented. A message may also be sent to message server 110 by the network component every time it learns that mobile device 130 is receiving media content or stops receiving media content. Message server 110 will store the media reception status from the message in a continuously updated file. In one embodiment, the continuously updated file is part of a user profile for mobile device 130 is updated upon the receipt of a message from a network component. Other methods of storing the media reception status from the message are also possible.

Message server 110 could receive a message conveying the media reception status of mobile device 130 from a variety of network components including IMS 114, affiliated media server 112, PDSN 120, or mobile device 130 it self. The interactions between messaging server 110 and these components have been described previously with reference to method 200.

Upon determining that mobile device 130 is receiving media content, at step 320 message server 110 transmits an activation message to mobile device 130. The activation message instructs the mobile device to begin a notification-presentation process that results in presenting the message notification contemporaneously with the media content. The message notification may be presented contemporaneously with the media content in a variety of ways. If the media content is in a solely audio form such as a MP3 or radio program, then the mobile device communicates an audible indication that a message notification has been received. For example, the indication could be a brief tone or beep.

If the mobile device is displaying a visual media content such as a movie, video, or television show the notification may be given in a portion of the screen where media content is not being displayed. The indication could also be given by overlaying a notification over a portion of the display. The overlay could be partially translucent. The indication could be in the form of an icon or text. The indication may remain displayed during the media presentation or it may be displayed for a period of time and then removed. During a visual media content presentation, an audio indication could also be given.

The activation message could be sent in a variety of formats including an RTP packet, SIP Invite, SIP Notify, SMTP, or SMS message. The operation and advantages of using each of these method types has been described with reference to method 200.

The activation message could be received by a client application or the operating system running on mobile device 130. The operating system could receive the activation message and adjust the amount of display provided to the media client for the presentation. In this situation the media client would not need to be modified to implement the present invention. The activation message could also be received by a notification client or media client that could perform the message notification presentation.

With reference to FIG. 4, a method of communicating a message notification on mobile device 130 is shown. At step 410, media content is presented through a user interface on mobile device 130. The media presentation occupies the entire user interface. A variety of different media content may be may be presented through one or more user interfaces including videos, video calls, movies, television shows, radio programs, and MP3's. The media may be presented through more than user interface at a time. For example, a video presentation might use a display and a speaker. Examples of user interfaces through which media content may be presented include a display, a speaker, an ear plug, or headphones.

At step 420, a message notification is received by mobile device 130 via a wireless network. The message notification may communicate that an email is waiting, a voicemail is waiting, a text message is waiting, a calendar or task reminder is waiting, or another type of communication has been received and is ready for the user's attention. The message notification may take a variety of forms including a SIP Notify, SMS, RTP, or SMTP message. The use of these message types has been explained with reference to method 200. Other message types may also be possible.

At step 430, mobile device 130 contemporaneously communicates the message notification and the media content through the user interface without interrupting the media content. A contemporaneous presentation of the message notification and media content means that both may be viewed at the same. The message notification may be presented contemporaneously with the media content in a variety of ways. If the media content is in a solely audio form such as a MP3 or radio program, then the mobile device may communicate an audible indication that a message notification has been received. For example, the indication could be a beep or a tone.

If mobile device 130 is displaying a visual media content such as a movie, video, or television show the notification may be given in a portion of the screen where media content is not being displayed. The message notification could also be given by overlaying an icon or text over a portion of the display. The message notification could be translucent or solid. The indication may remain displayed during the media presentation or it may be displayed and then removed. Other methods of displaying the message notification, including those explained with reference to methods 200 and 300, could be used.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of sending a message notification to a mobile device having a display, the method comprising:
   when attempting to communicate said message notification from a message server to said mobile device, determining at the message server that the mobile device is currently receiving media content by evaluating a type of data packet being received by the mobile device;
   upon determining that the mobile device is receiving media content, transmitting an activation message to the mobile device that instructs the mobile device to begin a notification-presentation process that comprises,
   (1) resizing a first portion of said display in which said media content is presented to a smaller size to make screen space available for the message notification to be presented, and
   (2) allocating a second portion of said display in which to present said message notification; and
   contemporaneously presenting said media content in said first portion and said message notification in said second portion.

2. The media of claim 1, wherein the message notification communicates at least one of the following:
   an email is waiting;
   a voicemail is waiting;
   a text message is waiting;
   a multimedia message is waiting;
   a calendar notification is waiting; and
   a task notification is waiting.

3. The media of claim 1, wherein the mobile device is capable of receiving media content over a wireless network and placing a phone call.

4. The media of claim 1, wherein the mobile device is capable of receiving media content over a wireless network and receiving communications over a wireless network.

5. The media of claim 1, wherein the media content includes at least one or more of the following:
   a TV program; and
   a movie.

6. The media of claim 1, further comprising querying one or more network components to determine the type of data packet being received by the mobile device, wherein the network components include one or more of the following:
   a PDSN;
   an IP multimedia subsystem server;
   an affiliated media server; and
   a non-affiliated media server.

7. The media of claim 1, wherein the activation message is sent in a format including one or more of the following:
   a SIP Notify;
   a SIP Invite;
   a SMTP;
   an RTP packet; and
   a SMS message.

8. One or more non-transitory computer-readable media having computer-executable instructions embodied thereon for performing a method of communicating a message notification on a mobile device, the method comprising:
   when attempting to communicate said message notification to said mobile device, determining whether the mobile device is currently receiving media content, said determining being accomplished by inspecting a header within a data packet received by the mobile device and determining that the header information indicates a type of data packet associated with the media content;
   and upon determining that the mobile device is receiving media content, communicating an activation message to the mobile device that instructs the mobile device to begin a notification-presentation process that results in presenting the message notification contemporaneously with the media content.

9. The media of claim 8, wherein the mobile device is capable of receiving media content over a wireless network and placing a phone call.

10. The media of claim 8, wherein the mobile device is capable of receiving media content over a wireless network and receiving communications over a wireless network, wherein communications include one or more of the following:

a phone call;
a video call;
a multimedia message;
an email;
a text message;
a voicemail;
a calendar reminder; and
a task reminder.

11. The media of claim 8, wherein the media content includes at least one or more of the following:
a TV program;
a radio program;
a MP3;
an audio file;
a video call;
a movie; and
a video.

12. The media of claim 8, wherein the notification-presentation process includes one or more of the following:
displaying an icon;
displaying text;
displaying the message notification in a bar located near the perimeter of a display;
generating an audible indication; and
displaying a translucent icon.

13. The media of claim 8, wherein the activation message is received by one or more of the following:
an operating system running on the mobile device;
a media client; and
a notification client.

14. One or more non-transitory computer-readable media having computer-executable instructions embodied thereon for performing a method of communicating a message notification on a mobile device, the method comprising:
presenting media content on a display on the mobile device; wherein the media content consumes all of said display;
receiving a query from a message server requesting information regarding types of data packets currently being received by the mobile device;
communicating to the message server information about the types of data packets being received;
receiving a message notification via a wireless network;
resizing a first portion of said display in which said media content is presented to a smaller size to make screen space available for the message notification to be presented;
and through the user interface, contemporaneously communicating the message notification with the media content in a portion of the display made available by said resizing.

15. The media of claim 14, wherein the mobile device is capable of receiving media content over a wireless network and placing a phone call.

16. The media of claim 14, wherein the mobile device is capable of receiving media content over a wireless network and receiving communications over a wireless network, wherein communications include one or more of the following:
a phone call;
a video call;
an email;
a text message;
a voicemail;
a multimedia message;
a calendar reminder; and
a task reminder.

17. The media of claim 14, wherein the media content includes at least one or more of the following:
a TV program;
a radio program;
a MP3;
an audio file;
a video call;
a movie; and
a video.

18. The media of claim 14, wherein the activation message is received by one or more of the following:
an operating system running on the mobile device;
a media client; and
a notification client.

19. The media of claim 14, wherein the user interface includes one or more of the following:
a display;
a speaker;
an ear plug; and
a headphone set.

20. The media of claim 14, wherein contemporaneously communicating the message notification with the media content includes displaying a message notification icon on a display while the media presentation is on going.

* * * * *